United States Patent [19]
Chartet

[11] 3,855,682
[45] Dec. 24, 1974

[54] METHOD OF SOLDERING TOGETHER AN ALUMINUM PART AND A FERROUS OR CUPROUS METAL PART

[75] Inventor: André Chartet, Meudon, France

[73] Assignee: Societe Anonyme Des Usines Chausson, Asnieres, France

[22] Filed: Apr. 2, 1973

[21] Appl. No.: 346,758

[30] Foreign Application Priority Data
Apr. 6, 1972   France .............................. 72.12153

[52] U.S. Cl. ................. 29/157.3 R, 29/495, 29/502
[51] Int. Cl. ...................... B21d 53/02, B23p 15/26
[58] Field of Search ........ 29/495, 157.3 B, 157.3 R, 29/502

[56] References Cited
UNITED STATES PATENTS

| | | | |
|---|---|---|---|
| 3,497,400 | 2/1970 | Stokes et al. ..................... | 29/495 X |
| 3,655,461 | 4/1972 | Miwa ................................ | 29/495 X |
| 3,694,899 | 10/1972 | Chartet ............................... | 29/495 |

FOREIGN PATENTS OR APPLICATIONS

| | | | |
|---|---|---|---|
| 236,213 | 5/1969 | U.S.S.R. ............................... | 29/495 |

Primary Examiner—C. W. Lanham
Assistant Examiner—D. C. Reiley, III
Attorney, Agent, or Firm—Flynn & Frishauf

[57] ABSTRACT

To join an aluminum containing first part to a second part, the second part is coated with a soldering alloy melting at a temperature lower than 320°C, the first part and the second part are assembled and the assembly is subjected to an organic flux containing a metal fluoborate reducible by aluminum at a temperature lower than 320°C. The fluxed assembly is then heated to melting point of the soldering alloy.

11 Claims, 1 Drawing Figure

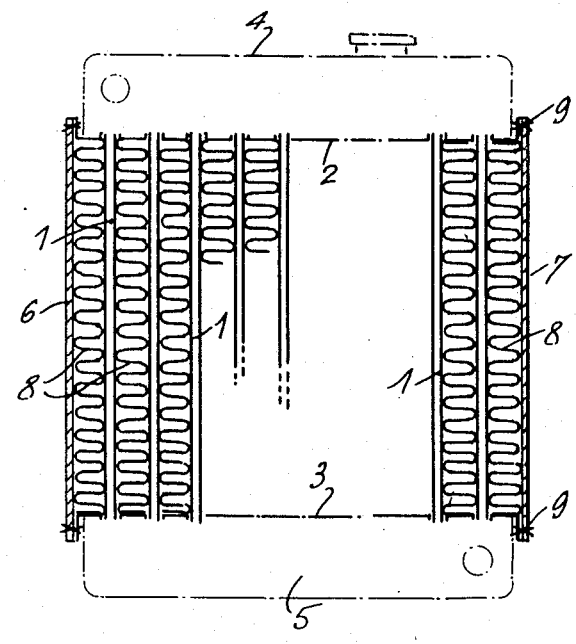

METHOD OF SOLDERING TOGETHER AN ALUMINUM PART AND A FERROUS OR CUPROUS METAL PART

The present invention relates to a method to join first and second elements, one of which the manufacture of composite heat exchangers, having parts made of different metals. Heat exchangers may have disturber elements which are formed by corrugated strips placed between the tubes or rows of tubes or constituted by fins slipped on the tubes. These elements often are made of aluminium or aluminium alloy, while the tubes as well as the tube plates (in which the tubes are engaged or also the tubes forming themselves elementary tubes plates at the two ends thereof), are made of cuprous or ferrous metals, particularly of brass or stainless steel.

The invention is particularly directed to a connection by soldering at low melting point between the aluminium and the cuprous or ferrous metals without the necessity to use corrosive fluxes, that is fluxes containing alkaline chlorides such as the lithium chlorides, sodium chlorides, etc... Such fluxes require, after their utilization, complex washings of the assembled parts. Actually such wash is very expensive and very difficult to realize in the case of heat exchangers since it has to be done with great care on the outside of the exchanger as well as on the inside thereof.

The invention may be used in presently existing manufacturing installations for the manufacture of the exchangers in which all of their parts made of cuprous metals.

Subject Matter of the invention: Briefly, a method is provided for joining together an aluminium containing first part and a second part made of a metal selected from the group consisting of ferrous and cuprous metals comprising the steps of covering the second part with a soldering alloy melting at a temperature lower than 320°C, assembling the first part and the second part, submitting the assembly to an organic flux containing a metal fluoborate reducible by aluminium at a temperature lower than 320°C whereby metal from said fluoborate is deposited as a protective coating on the aluminium of the first part after removing the alumina layer from the aluminum, and heating the fluxed assembly up to melting point of the soldering alloy, whereby the soldering alloy wets the aluminum containing part and is made adhering, said protective coating making an interpenetration layer.

Other characteristics of the invention will appear from the following detailed description.

An embodiment of the invention is shown by way of non-restrictive example in the accompanying drawing, in which the only one FIGURE is a diagrammatic cross-sectional elevation view of a heat exchanger which can be used as a heat convector in a vehicle or as a cooling radiator for the engine of said vehicle.

The drawing shows, a heat exchanger comprising tubes 1 engaged, through ends thereof, into tube-plates 2 and 3 the same being designed to be covered by headers 4 and 5. Besides, lateral flanges 6,7 are provided to connect the tube plates 2 and 3 together, (or the headers 4, 5, respectively depending on said flanges are fixed to one or to the other of those components).

Furthermore, the heat exchanger comprises flow disturbers 8 which also form surface extenders and represented in the drawing in form of corrugated strips respectively connecting the walls of two consecutive tubes 1.

The invention, as described in the following disclosure, relates in the same way to heat exchangers wherein the corrugated strips 8 would be replaced by fins having apertures for passage of the tubes 1.

The tubes 1 and tube-plates 2 and also the headers 4 are made either of cuprous alloys, or of ferrous alloys, preferably of stainless steel. The corrugations, or fins are made of aluminium or aluminium alloys, the alloys may contain silicium or magnesium but with the condition that the proportion of silicium be not higher than 5 percent in weight and the proportion of magnesium not higher than 1.5 percent in weight.

The above described parts made of ferrous or cuprous alloys form a support for soldering alloy to be assembled together as well as with the disturbers 8. For that purpose those parts are preferably covered with a soldering alloy before being mutually assembled and even, in some cases, before being formed, that is when they are still in the form of strips being then shaped into tubes or tube plates.

For purposes of the invention, a soldering alloy includes all the soldering alloys having a melting temperature lower than 320°C and especially:
 a. tin-lead alloys
 b. tin-lead-zinc alloys
 c. tin-lead-cadmium alloys
 d. tin-zinc alloys
 e. zinc-cadmium alloys
 f. tin-lead-cadmium-zinc alloys The deposit of the soldering alloy on the parts made of cuprous or ferrous alloys is made in usual way, e.g., by dipping the parts in a bath of molten soldering alloys, said dipping step being followed by a drip-off step and a wiping step to control the thickness of the soldering coating (which usually ranges between 20 and 50$\mu$.)

After assembling the heat exchanger core, that is at least the tubes into the tube plates, the disturbers 8 and the flanges 6, which are advantageously connected to the tube plates by electrical welding points 9, the disturbers 8, made of aluminium or aluminium alloys are soldered to the tubes 1, by the following method:

The preassembled, coated core is submitted to action of a flux constituted by an aqueous solution containing: zinc fluoborate Zn (BF$_4$)$_2$ or some cadmium or tin fluorborate — or a compound thereof or a fluoborate of one or several other metals reducible by the aluminium at a temperature lower than 320°C, diethylenetriamine and triethanolamine, while taking care to maintain a ratio for which, to one mol of fluoborate preferably corresponds at least two moles of diethylenetriamine. It is advantageous that the quantity of diethylenetriamine be as low as possible considering its relatively high cost. For example the concentrated flux can contain 30.7 percent by weight of a 50 percent aqueous solution of Zn (BF$_4$)$_2$, 14.9 percent by weight of diethylenetriamine and 54.4 percent of triethanolamine, this concentrated flux being diluted in water so that the resulting aqueous flux contains about 50 percent of concentrated flux.

The fluxing of the assembling core, as above explained, is made at room temperature either by dipping or by gun spraying or by any other means.

Though the exact process for the connection of the above flux is not exactly known, it seems yet that it causes a moving of the coat of alumina covering the disturbers 8 through action of the triethanolamine thus allowing the zinc fluoborate, for example, to deposit its zinc on the surface of the aluminium, while the diethylenetriamine prevents precipitation of the zinc hydroxide into the solution by keeping the same in the condition wherein it tends to spontaneously deposit on the aluminium no longer covered with the oxide coating.

After the fluxing step, the radiator core is heated up to the point to cause melting of the soldering alloy with which the tubes and tube plates are covered. A tight joint is formed at the intersection of the tubes ends and the tube plates, and simultaneously the melting of the soldering alloy covering the tubes ensures the connection with the disturbers 8, the zinc or other metal having been deposited on the wall of said disturbers constituting an interpenetration interlayer ensuring gripping of the soldering alloy.

It is advantageous that the core reaches melting temperature very quickly and the best results have been obtained by passing said cores into ovens with pulsed atmosphere in which ovens the cores remained about one minute at a temperature within the range of 300° to 320°C.

Concerning the headers 4, the same can be placed, after the soldering of the parts of the core, by usual means, that is by joining the edge of the tube-plates to the edge of the headers through melting a soft solder containing tin, or said headers can be soldered to the tube plates during the process of soldering the other parts of the heat exchanger, which means during the passage in the oven causing the soldering of the tubes in the tube plates and that of the disturbers with the wall of the tubes.

The invention is not restricted to the embodiments shown and described in detail, for various modifications thereof may be applied to them without departing from the scope of the invention.

I claim:

1. A method for joining together an aluminum containing first part and a second part made of a metal selected from the group consisting of ferrous and cuprous metals comprising the steps of:
coating the surface of the second part with a soldering alloy having a melting point at a temperature lower than 320°C,
assembling the first part and the second part,
subjecting the assembly to an organic flux containing an aqueous solution of triethanolamine, diethylenetriamine and a metal fluoborate which can be reduced by aluminum at a temperature lower than 320°C, heating the assembly and the flux at least to said temperature whereby the metal in the fluoborate is reduced out and deposited as a protective coating on the aluminum of the first part after removing the alumina layer from the aluminum,
heating the fluxed assembly up to melting point of the soldering alloy, whereby the soldering alloy wets the aluminum containing part and is made adhering thereto, said protective coating forming an interpenetration layer.

2. A method as set forth in claim 1, wherein the first part is a heat disturber and the second part is a tube, a plurality of heat disturbers and tubes being assembled to form a heat exchanger core.

3. A method as set forth in claim 1, wherein the metal fluoborate comprises at least one member of the group consisting of zinc, cadmium and tin fluorborate.

4. A method as set forth in claim 1, wherein the flux has a composition wherein each mole of the metal fluoborate corresponds at least two moles of diethylenetriamine.

5. A method as set forth in claim 1, wherein the flux comprises:

| zinc fluoborate in solution at water | 50 % | in |
|---|---|---|
| | 30.7 % | by weight |
| diethylenetriamine | 14.9 % | by weight |
| triethanolamine | 54.4 % | by weight |

6. A method as set forth in claim 5, wherein the flux is diluted into an equivalent weight of water.

7. A method as set forth in claim 1, wherein the soldering alloy is selected from the group consisting of:
zinc-cadmium alloys
lead-tin-cadmium-zinc alloys
tin-zinc alloys
lead-tin-cadmium alloys
lead-tin-zinc alloys
tin-lead alloys the melting temperatures of which being always lower than 320°C.

8. A method as set forth in claim 1 wherein melting of the soldering alloy is performed in an oven immediately after deposit of the organic flux and by passing the assembly in said oven during about 1 minute.

9. A method as set forth in claim 1, wherein melting of the soldering alloy is performed in an oven wherein gas is pulsed.

10. A method as set forth in claim 1, wherein melting of the soldering alloy is performed in an oven at a temperature between about 300° to 320°C.

11. A method as set forth in claim 1, wherein said first part is made of an aluminium containing alloy containing no more than 5 percent of silicon and 1.5 percent of magnesium.

* * * * *